(12) United States Patent
Kendall et al.

(10) Patent No.: US 12,507,677 B2
(45) Date of Patent: Dec. 30, 2025

(54) FISH STRINGER SYSTEM

(71) Applicant: STAY ALIVE STRINGER, LLC, Sand Lake, MI (US)

(72) Inventors: Matthew Donald Kendall, Sand Lake, MI (US); Charles Mark House, Walker, MI (US)

(73) Assignee: Stay Alive Stringer, LLC, Sand Lake, MI (US)

( * ) Notice: Subject to any disclaimer, the term of this patent is extended or adjusted under 35 U.S.C. 154(b) by 0 days.

(21) Appl. No.: 18/593,782

(22) Filed: Mar. 1, 2024

(65) Prior Publication Data

US 2024/0292817 A1 Sep. 5, 2024

Related U.S. Application Data

(60) Provisional application No. 63/449,053, filed on Mar. 1, 2023.

(51) Int. Cl.
*A01K 65/00* (2006.01)
(52) U.S. Cl.
CPC .................................. *A01K 65/00* (2013.01)
(58) Field of Classification Search
CPC ............................... A01K 97/20; A01K 65/00
USPC ............................................................ 43/55
See application file for complete search history.

(56) References Cited

U.S. PATENT DOCUMENTS

| | | | | |
|---|---|---|---|---|
| 3,561,652 A | * | 2/1971 | Ruter | A01K 65/00 224/103 |
| 3,765,119 A | * | 10/1973 | Hare | A01K 97/14 43/87 |
| 4,023,303 A | * | 5/1977 | Maunu | A01K 97/18 452/187 |
| 4,083,142 A | * | 4/1978 | Gregerson | A01M 23/34 43/87 |
| 4,216,607 A | * | 8/1980 | Lyster | A01K 69/06 43/87 |
| 4,271,625 A | * | 6/1981 | Archer | A01M 23/34 43/87 |
| 4,697,381 A | * | 10/1987 | Esgro | A01K 69/00 43/100 |
| 6,067,942 A | * | 5/2000 | Fernandez | A01K 74/00 119/804 |
| 2017/0251640 A1 | * | 9/2017 | Eastman | A01K 27/005 |
| 2024/0292816 A1 | * | 9/2024 | Million | A01K 97/14 |

* cited by examiner

*Primary Examiner* — Christopher D Hutchens
(74) *Attorney, Agent, or Firm* — Craig A. Phillips; Dickinson Wright PLLC

(57) ABSTRACT

A fish stringer with a releasable connector designed to simplify and hasten the attachment and removal of a fish to a fish stringer, and even more particularly to a fish stringer that attaches to the tail portion of the fish and not the gills, fins, or mouth of the fish.

5 Claims, 13 Drawing Sheets

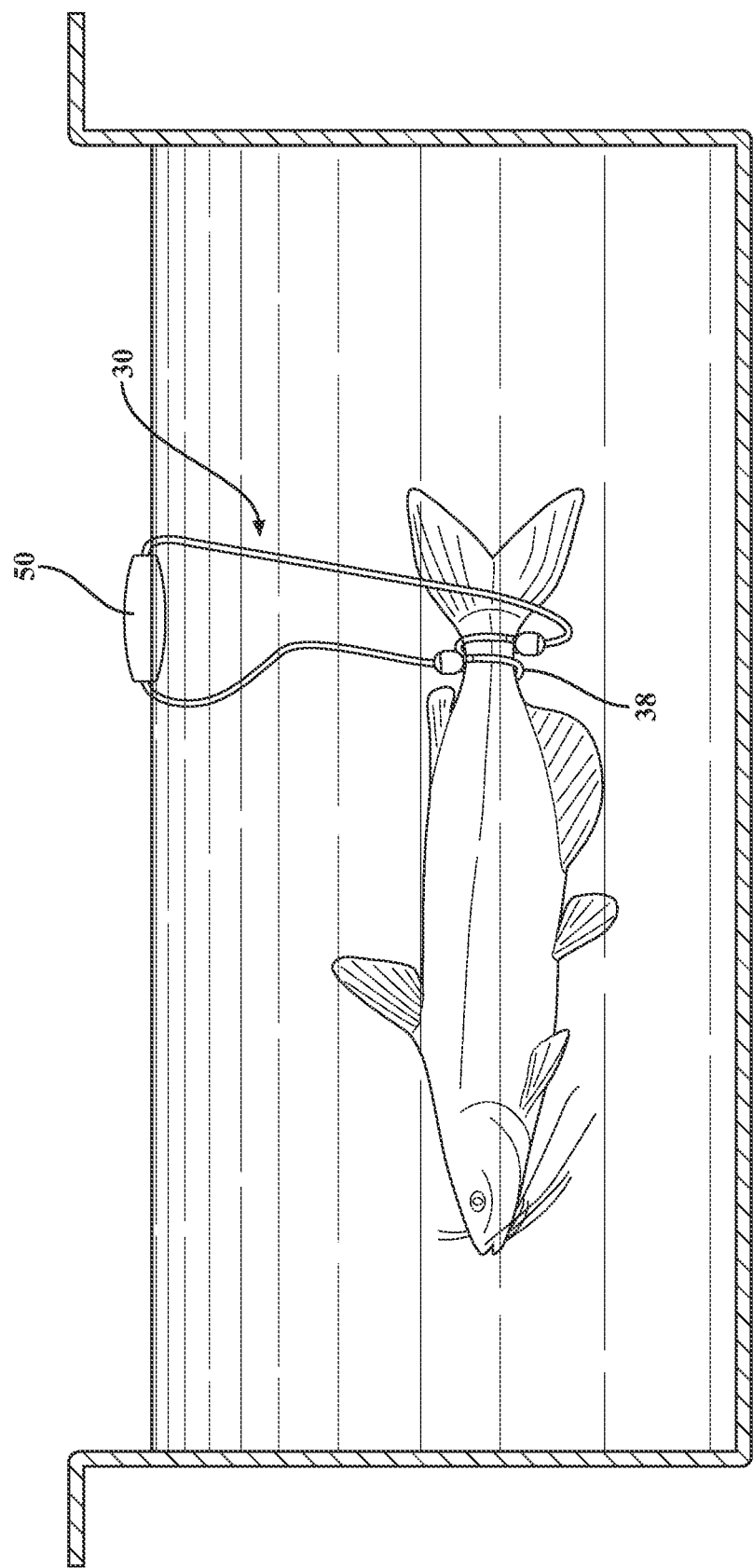

FISH STRINGER SYSTEM

CROSS-REFERENCE TO RELATED APPLICATIONS

This application claims the benefit of U.S. Provisional Application Ser. No. 63/449,053 filed Mar. 1, 2023, which is incorporated herein by reference in its entirety.

FIELD OF THE INVENTION

This invention relates to a fish stringing system, and more particularly to a fish stringing system with a releasable connector designed to simplify and hasten the attachment and removal of a fish to a fish stringer, and even more particularly to a fish stringer that attaches to the tail portion of the fish and not the gills, fins, or mouth of the fish.

DESCRIPTION OF THE RELATED ART

Fishing, is done both as a recreational activity and an occupation, around the world for thousands of years. When fishing for more than one fish, to maintain the freshness of the earlier caught fish people have developed many ways to place the fish back into the water and keep them alive, but allow them to keep them captured, and some are even configured to help transport the fish when done fishing. These various devices are commonly referred to as stringers, although originally baskets were used to store and transport the fish. Baskets are cumbersome, so over the years people developed stringers that would hold fish securely in the water while they would continue to fish and then allow them to be safely removed and transported, such as in the boat, or over land.

Almost all fish stringers today include a pre-determined length of line, connected to a hook or metal closure that is stuck through the mouth and gills of the fish. While these types of stringers are common and do keep the fish alive, they do not work well for all fish types, and are stressful to the fish, and can even injure the fish easily. A variety of different fish stringers have been developed over the years—but each are not capable of a quick connection/disconnection of the stringer line from the securing point much less easy attachment and disconnection from the fish. In addition, as most stringers injure the fish, if the decision is to put one of the stringer fish back after catching a better fish (e.g have to release one to stay under the catch limit), the released stringer fish typically doesn't survive for long.

For example, the fish stringer disclosed in U.S. Pat. No. 4,976,382 issued to Carpenter describes a curved stringing needle attached to a line at one end and the other line end is releaseably connected to a belt clip. When in use fish are threaded on the line by inserting the stringing needle up through the fish gills and into the mouth so that the fish can slide down the stringer line. This process is continued until the desired number of fish are threaded on the stringer. As such Carpenter is difficult to use and usually injures the fish. Also, if the person fishing has caught five fish, and desires to release the one in the middle, they have to go through difficult process of removing all fish from water, and then removing the two fish from the stringer, which may be difficult as they try to escape, as now there are three loose fish, one to be let go and two to go back on the stringer. While many other fish stringers have had patent applications filed and patents issued, they all almost without fail include some type of hook or line that is inserted through the gills of the fish.

The fish stringer disclosed in U.S. Pat. No. 4,960,231 issued to Popovich, contemplates securement of the line at one end to the middle of a toggle which is threaded through a loop secured to a wader. The other end of the line is secured to the middle of a needle. The securement of the line end to the middle of the needle prevents the strung fish from coming off the end of the cord. The securement of the line to the middle of the toggle releaseably secures the other end of the cord to a securing loop. The Popovich fish stringer does not sheath the needle when not in use. In fact, two ends of the needle are exposed when not in use and when in use—one end of the needle remains unsheathed which could result in injury to the operator of the fish stringer. As such Popvich has all the issues mentioned above.

Besides overcoming the deficiencies of the above disclosed fish stringers, the present invention provides a quicker, less complicated, safer, and overall a far more effective fish stringer as more fully described below, and more importantly one that is not inserted through the mouth or gills of the fish, preventing major injuries to the fish, and allows select removal of any fish along the stringer.

SUMMARY OF THE INVENTION

The present invention is directed to an improved fish stringer, specifically a fish stringer that attaches in the tail or peduncle area of a fish. The present invention is well suited for catfish, but also works on most other species of fish as well. The stringer includes a first component that forms a stringer line with a clip or other attachment mechanism at least one end that allow the stringer line to be attached to an object or person to keep it secure. The second component is at least one, typically a plurality of individual tail harnesses configured to be secured around the tail of the fish. As such, the present invention uses a unique tail harness to safely secure your fish, and then attach it to the stringer line. The stringer line may include loops spaced to clip the tail harnesses to, which serve to also limit the fish from being on top of each other, which may cause harm, but on a good fishing day, can allow more than one tail harness to be attached to each loop.

The present invention relates to a fish stringer configured to attach to the tail of a fish and not contact the gills or mouth of the fish. The fish stringer includes a tail harness having a fish attachment portion at one end and an attachment mechanism at the other end, and wherein the attachment mechanism is configured to securely and releasably attach to the at least one loop on the stringer line, and wherein the fish attachment portion includes at least one tail loop configured to attach to the tail of a fish. The tail harness includes at least two tail loops, wherein each of the tail loops if formed using a tail loop knot. The tail loop knot is a basic slip knot, but any other tail loop knot that allows adjustment of the loop size may be used.

The attachment mechanism on the tail harness is a swivel clip, however any other easily releasably but secure attachment mechanism may be used. To prevent unraveling or untying of the knot on the attachment mechanism on the tail harness the knot is treated to prevent untying. The treatment may be a waterproof sealant to harden the knot. The tail harness has a first cord extending between the attachment mechanism and a first tail loop, and a second cord extending between the attachment mechanism and a second tail loop.

The tail harness is configured to be installed on the fish tail with the first tail loop extending out on one side of the fish tail, and the other tail loop extending out on the other side of the fish tail. To allow easy retrieval of a fish out of the water, the tail harness may have a float attached.

The fish stringer may further include a stringer line having at least one loop and an attachment mechanism at one end of the stringer line and spaced apart from the loop. The at least one loop is a plurality of loops on the stringer line and the string line has a loop free portion between the attachment mechanism and a first loop of the plurality of loops. The attachment mechanism, typically a snap clip is attached to the stringer line with typically an overhand knot, which is usually treated to prevent untying, while the loop is formed with an overhand loop knot. The fish stringer is configured to attach to the tail of a fish and not contact the gills or mouth of the fish. It is important that the gills and mouth are not touched or used to secure the fish.

The prevent invention is further directed to a fish stringer comprising first a stringer line having a plurality of loops and an attachment mechanism at one end of the stringer line and spaced apart from the plurality of loops; and second a plurality of tail harnesses, each having at least two tail loops configured to attach to the tail of the fish at one end, and an attachment mechanism at the other end coupled to one of the plurality of loops on the stringer line, and wherein each of the tail loops is formed using a slip knot, which allows adjustment of the size of the tail loops. The attachment mechanism on the tail harness is attached with an overhand knot, and the attachment mechanism on the stringer line is also attached with an overhand knot, both treated to prevent untying. The tail harness is configured to be installed on the fish tail with the first tail loop extending out on one side of the fish tail, and the other tail loop extending out on the other side of the fish tail. The tail harness may have a float attached, such as a handle or bobber that allows easy grabbing of a fish harness, and they may be color coded with different colors to allow easy identification of what fish to pull. The fish stringer is configured to not attach to the fins, mouth or gills of the fish.

BRIEF DESCRIPTION OF THE FIGURES

FIG. 11 is an illustration of the floating tail harness in FIG. 9 in a boat live well

DETAILED DESCRIPTION OF INVENTION

Figure 1:
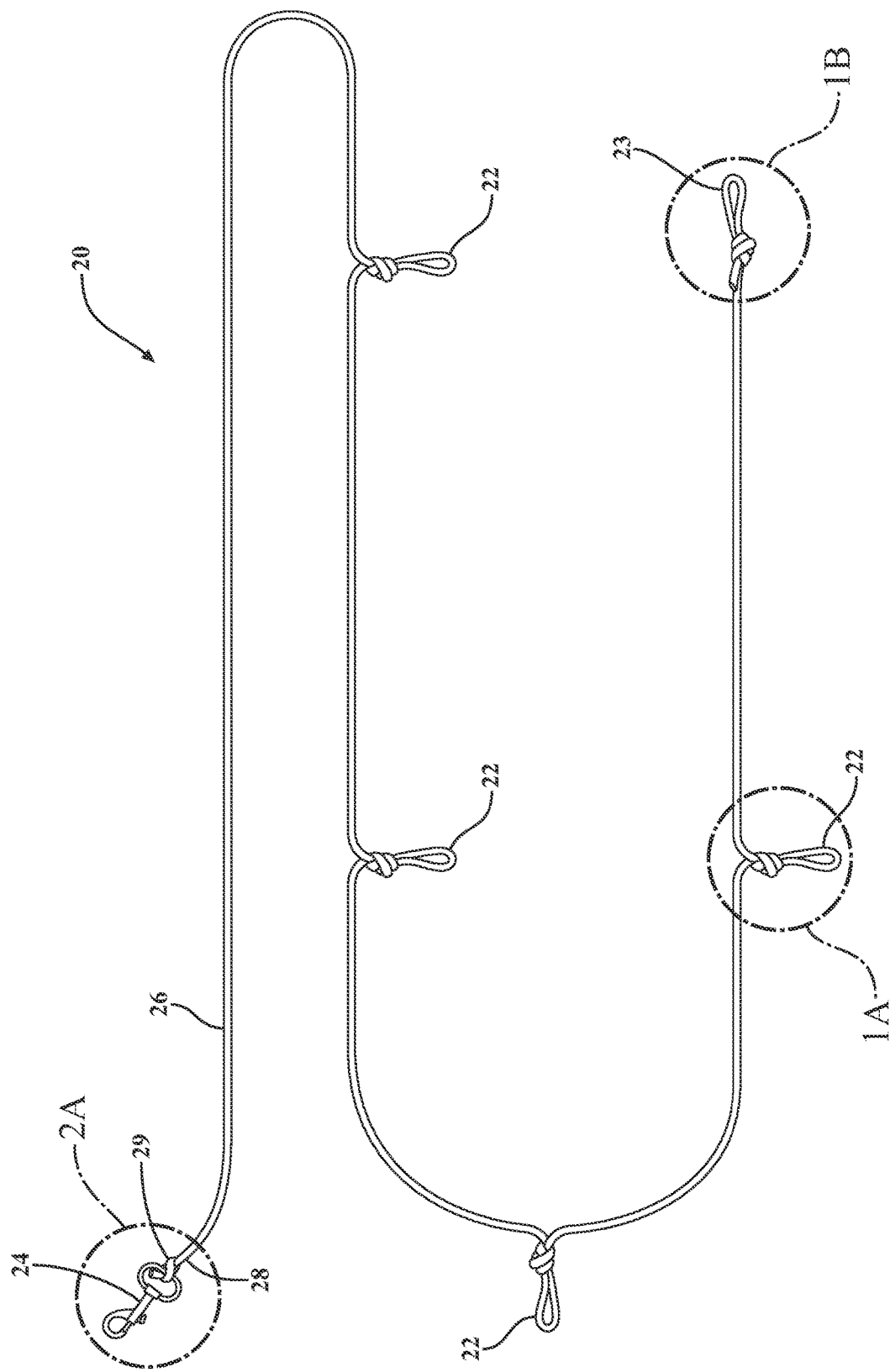
FIG. 1 is an illustration of a stringer line with loops.
Figure 1A:
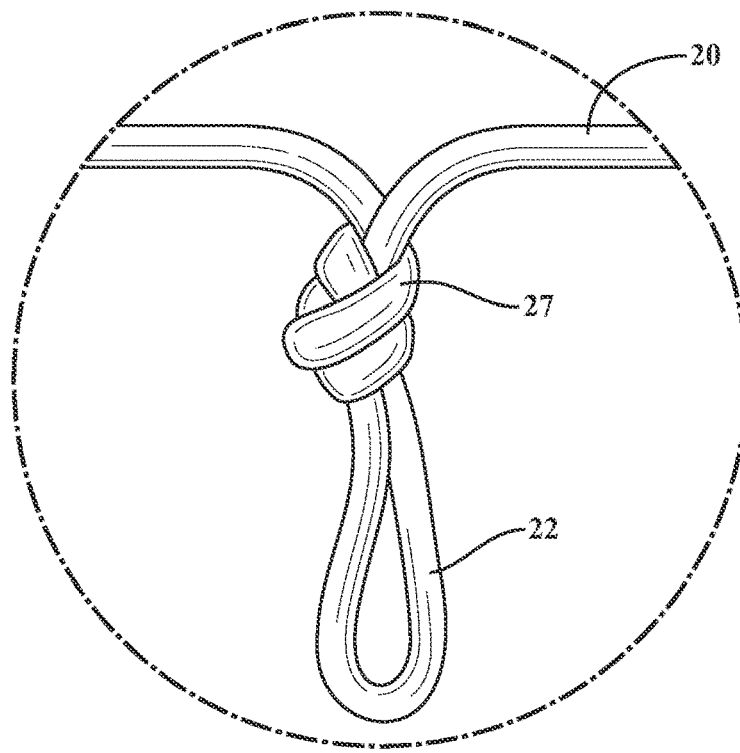
FIG. 1A is an enlarged view of a middle loop in FIG. 1.
Figure 1B:
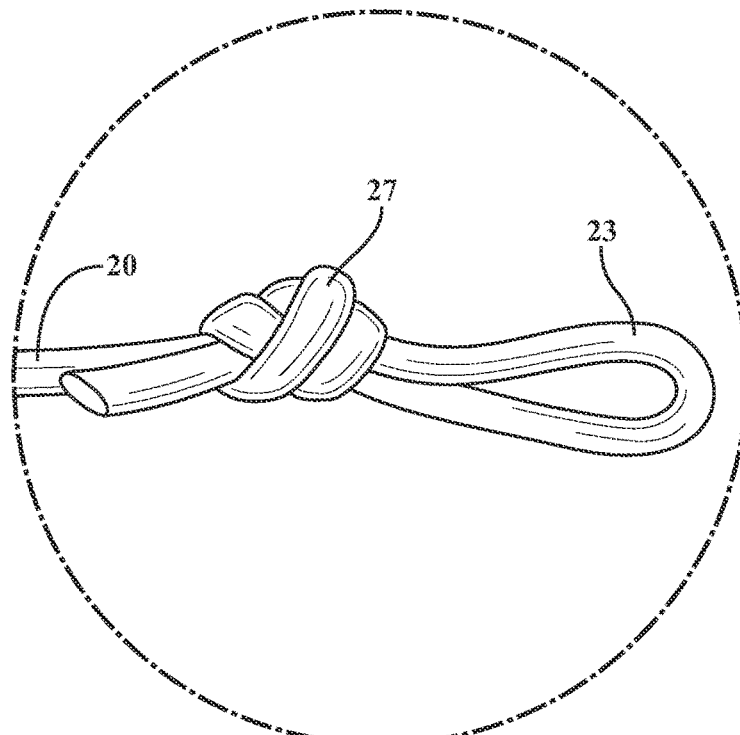
FIG. 1B is an enlarged view of an end loop in FIG. 1.
Figure 2:
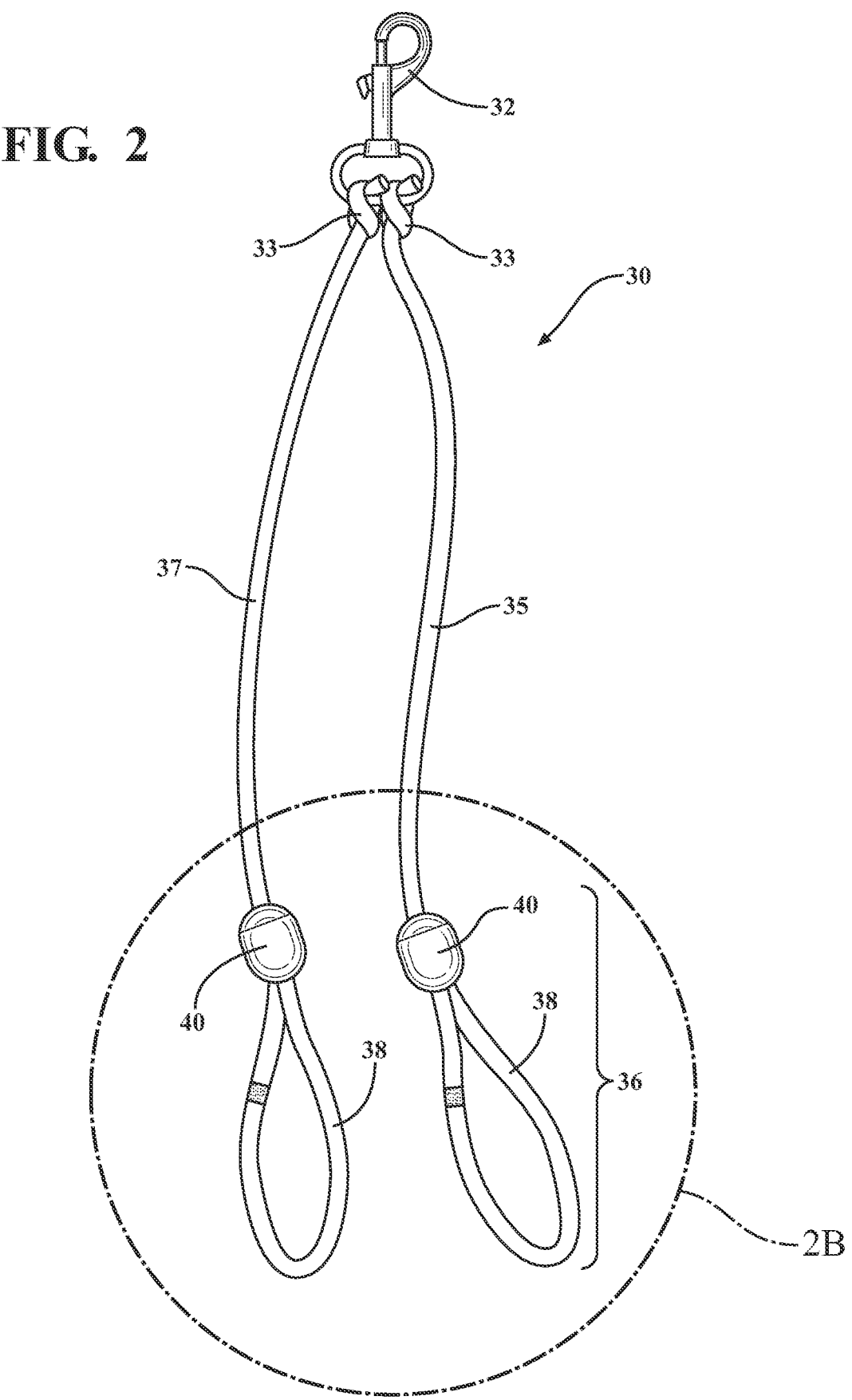
FIG. 2 is an illustration of a tail harness.
Figure 2A:
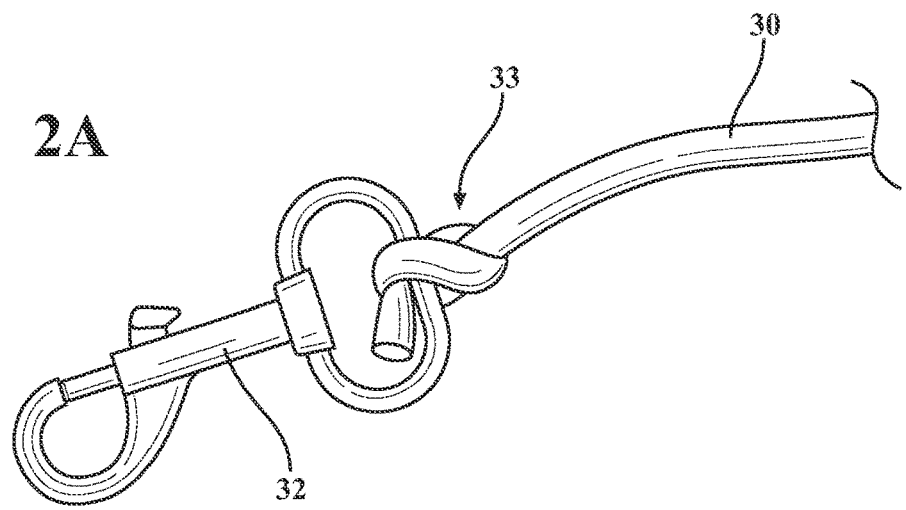
FIG. 2A is a picture of the hook on the end of the tail harness in FIG. 2.
Figure 2B:
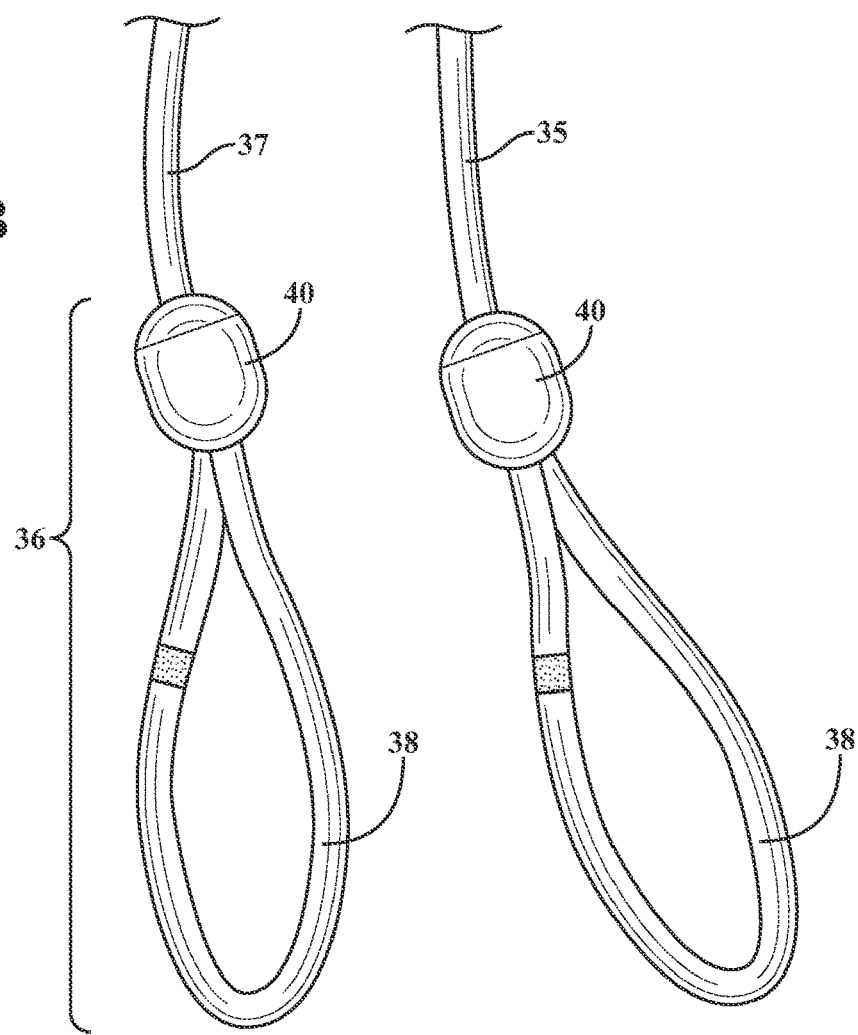
FIG. 2B is an enlarged illustration of the tail loops in FIG. 2.
Figure 3:
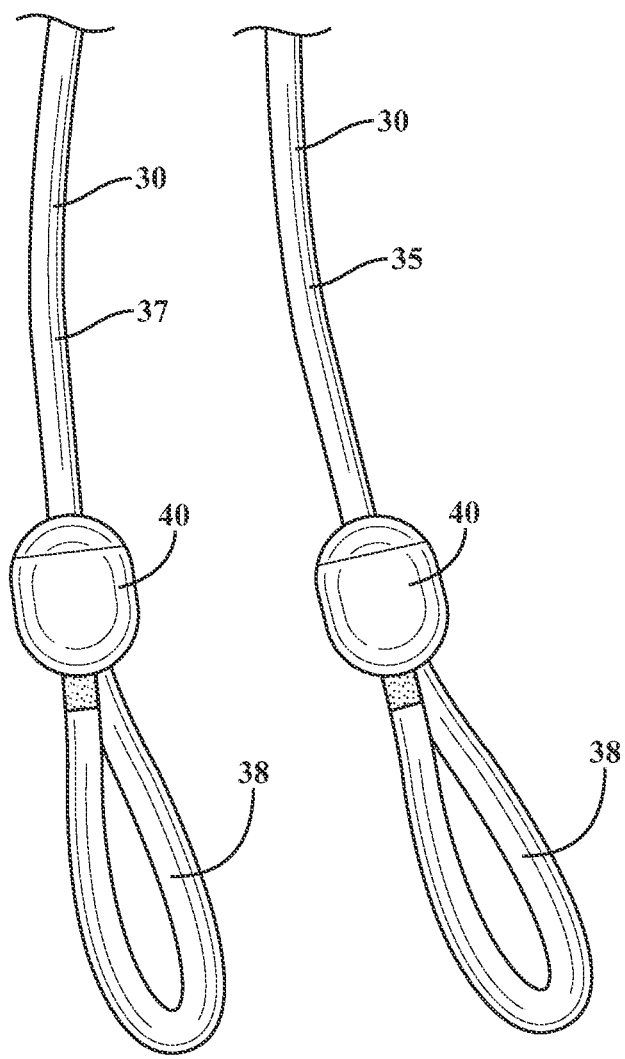
FIG. 3 is an illustration of the tail loops in FIG. 2B showing the loops in a tightened configuration
Figure 4:
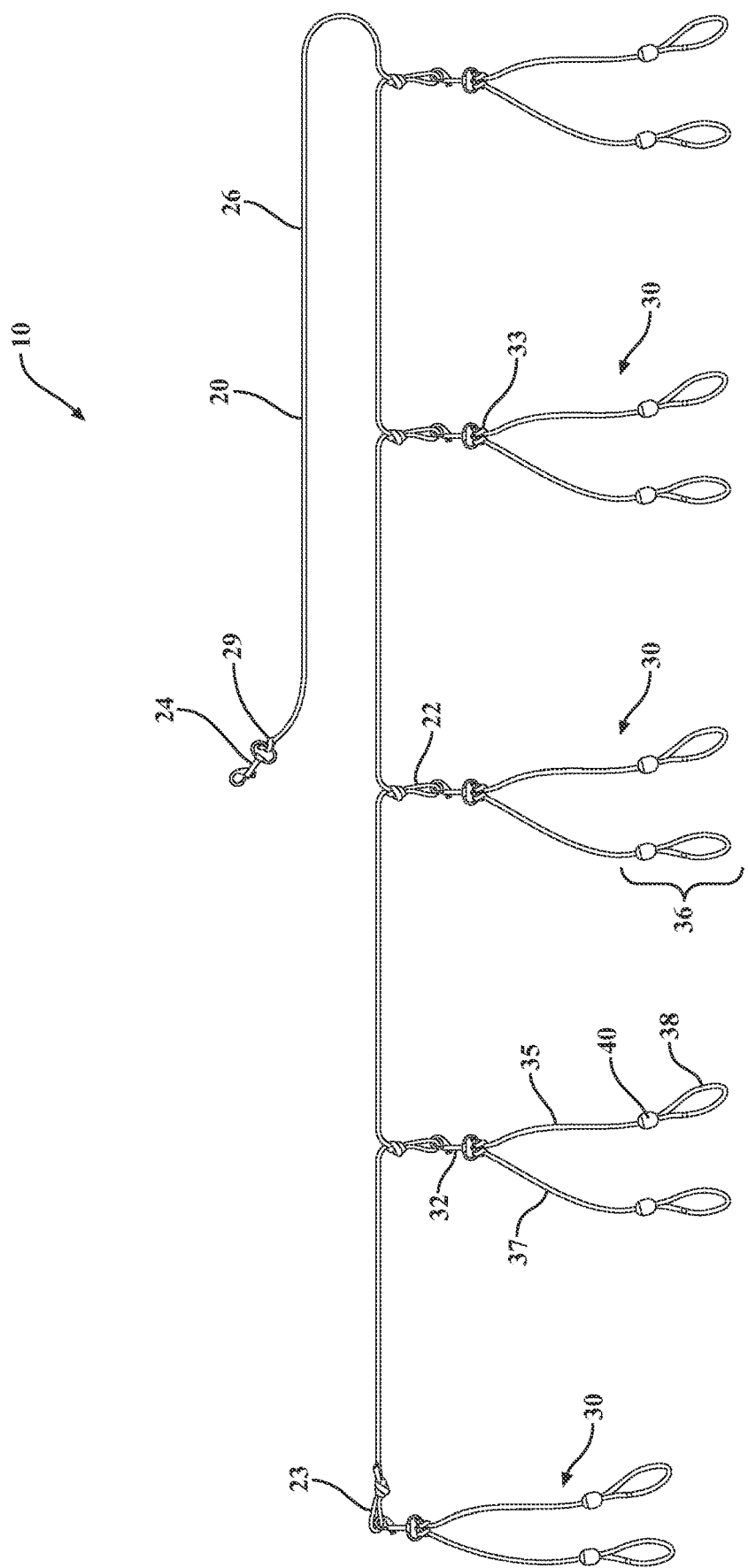
FIG. 4 is an illustration of a stringer having a stringer line and multiple attached ail harnesses.
Figure 5:
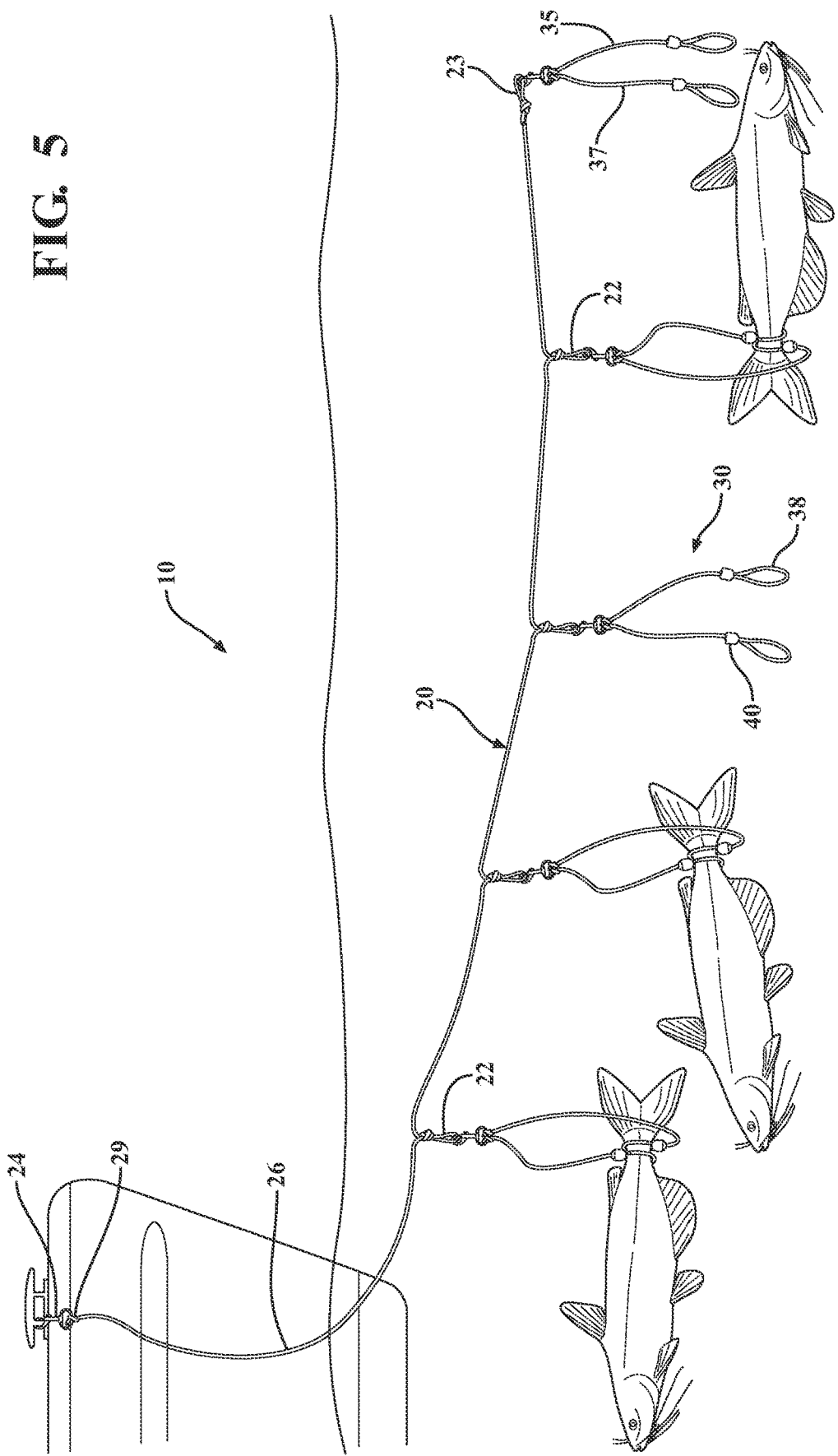
FIG. 5 is an illustration of a stringer attached to a boat and having catfish attached using the tail harnesses
Figure 6:
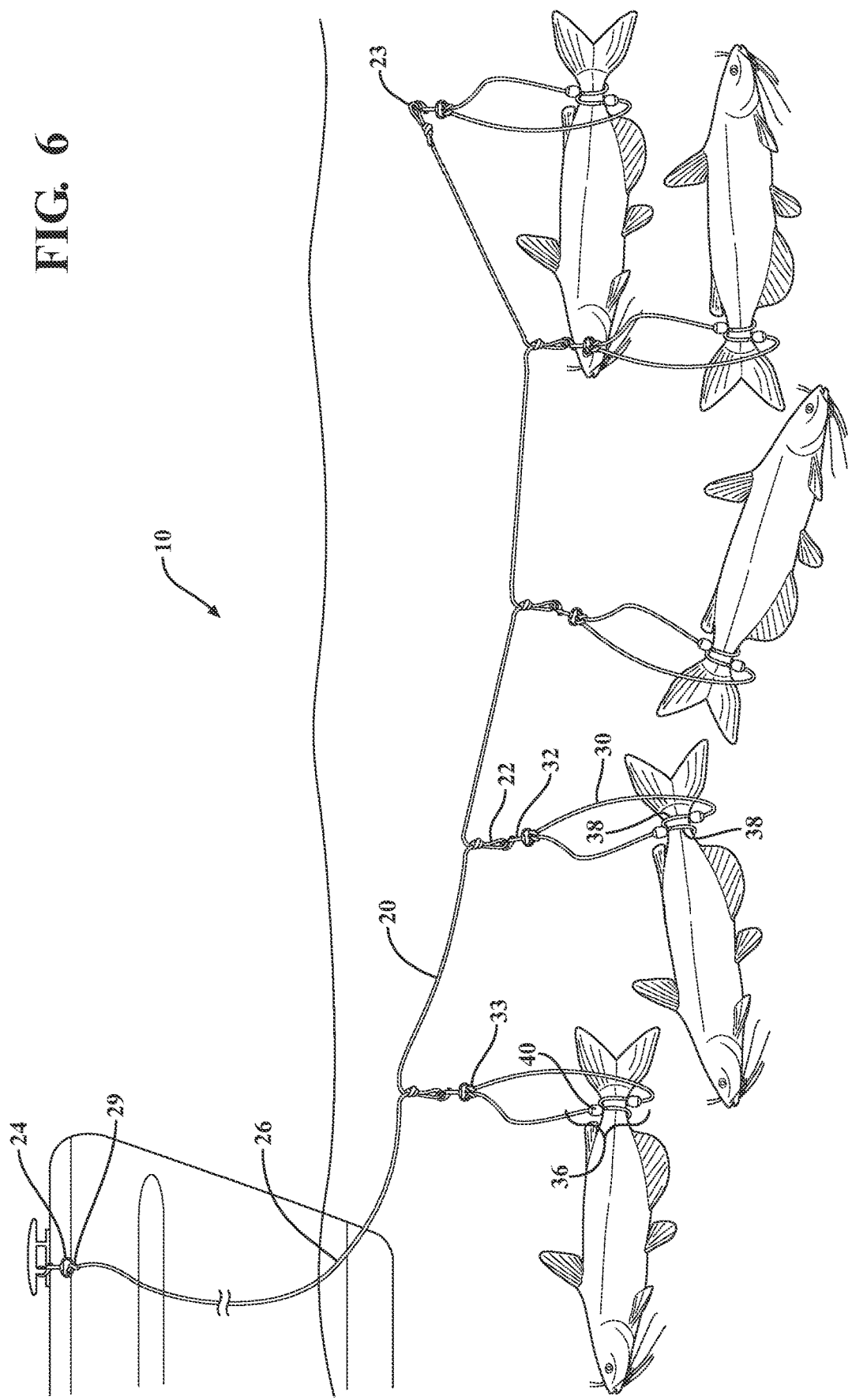
FIG. 6 is an illustration of the Stringer in FIG. 4 with additional fish

The stringer 10 was originally designed as a catfish stringer to be used for bank/shore fishing, but has been found to work well with many other fish species, as well as in a watercraft. As such, the stringer 10 may be used for species other than catfish. The stringer 10 generally includes two main components, a stringer line 20, intended to be anchored to an object, such as a shore/bank, dock, water craft, or anything else, including even being clipped to a person. The stringer line 20 generally includes a number of loops 22 or attachment points. The second component is a tail harness 30 that include some attachment mechanism 32, such as the illustrated snap or clip to couple the tail harness 30 to the stringer line 20, specifically on of the attachment points 22. The tail harness 30 further includes a fish attachment portion 36, such as the illustrated tail harness, typically a double loop tail harness 38 which can easily allow adjustment of the tail loop 38 size. The tail harness loops 38 are intended to be looped around the tail of the fish with the tail harness 30 being secured to the stringer line 20.

This design differs from traditional fish stringers in that traditional stringers are applied through the mouth and gills, frequently causing injury and/or death to the fish. The current stringer 10 is designed to fasten securely on the tail of the fish allowing the fish to swim freely and does not affect their ability to breathe normally, does not damage or injure their gills, and reduces the potential of injury, stress, and/or death to the fish. If there is a limit in how many fish may be taken in a single day, the present invention allows easy removal and release of one fish, without injuries common to typical stringers.

The stringer line 20 may be made of a variety of materials, but it has been found that cord, such as 550 wt. Paracord provides a good line with ability to make knots that stay, including slip knots. The stringer attachment mechanism 34 may be a swivel clip on one end to allow it to be attached to a stationary object (stake, tree, etc.). The stringer line 20 may vary in length and includes at least one loop or attachment point 22, but preferably includes a number of loops 22 spaced apart along the length of the stinger line 20. These loops 22 act as the attachment point for the tail harnesses 30. These loops 22 may vary in placement, but for most fish, including catfish are sufficiently spaced apart at approximately 12 inches apart. It should be noted if the length of the tail harnesses 30 is increased, the loops 22 may be spaced closer together, or if the tail harnesses 30 are shortened in their length, then it would be preferable for the tail harnesses to be about 12" from the attachment mechanism 32 to the end of the fish attachment portion 36. As such, the 10-foot stringer line 20 typically has five (5) loops, and the 15 foot stringer line 20 typically has 8 loops.

Figure 7:
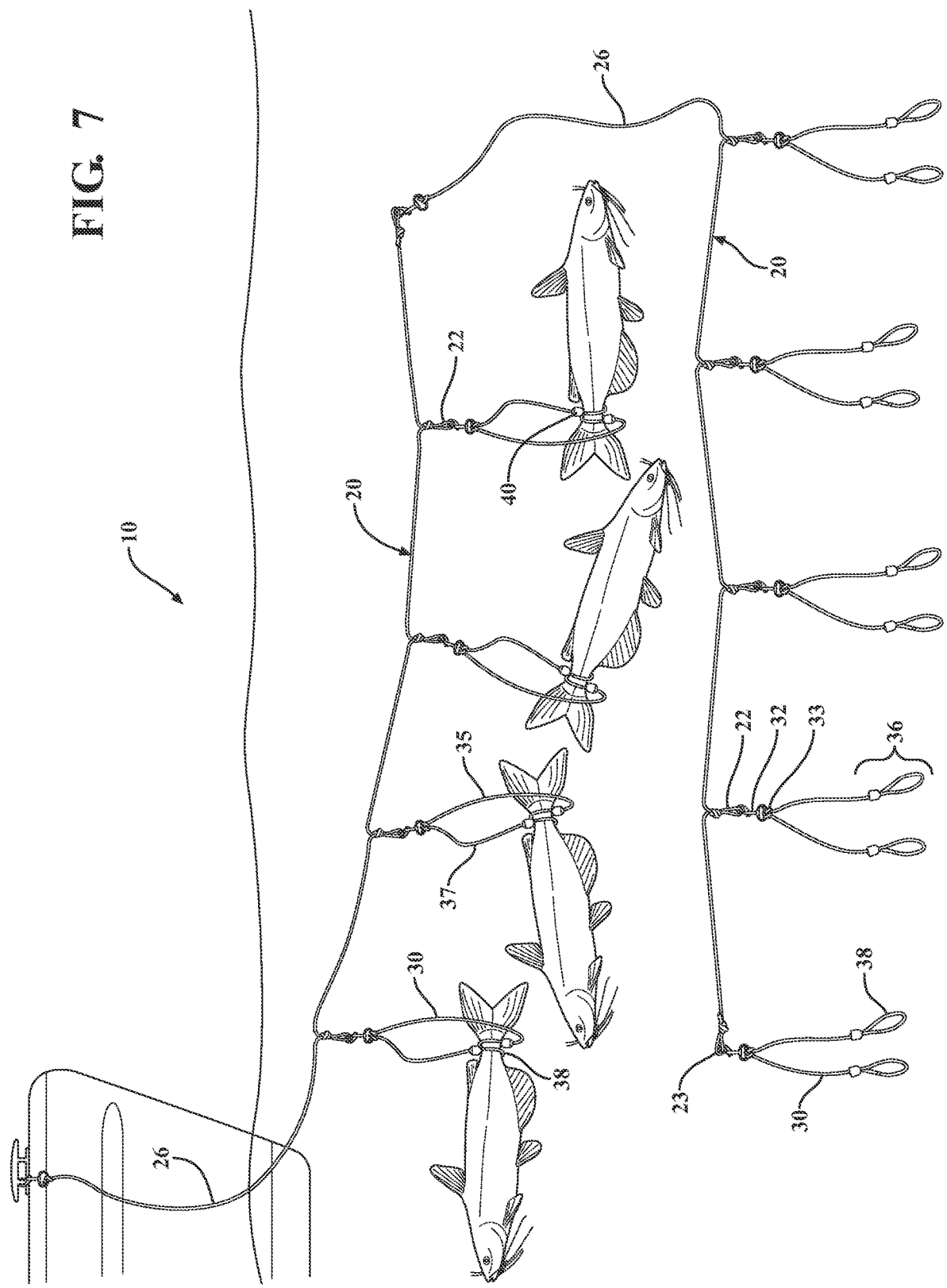
FIG. 7 is an illustration of a stringer with a second attached stringer line and tail harnesses.
Figure 8:
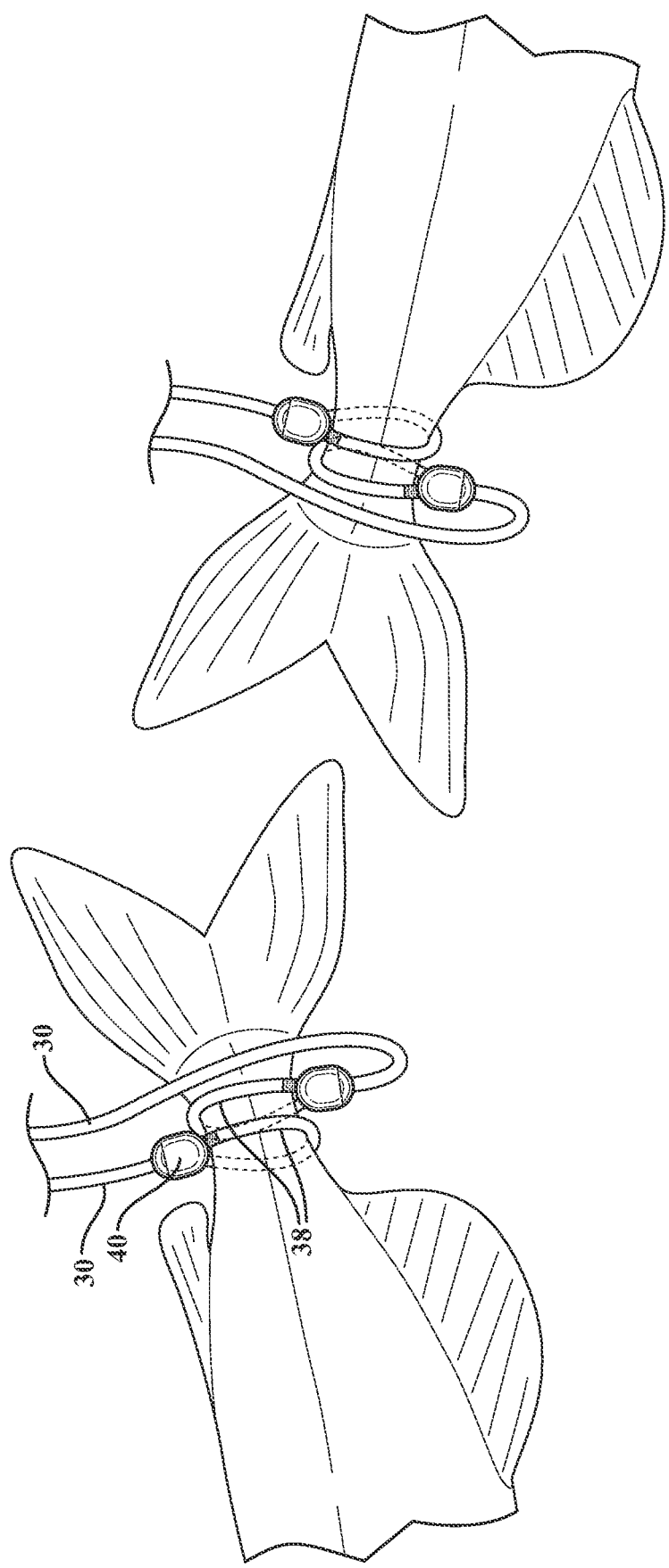
FIG. 8 is an enlarged illustration of the tail harnesses attached to a fish
Figure 9:
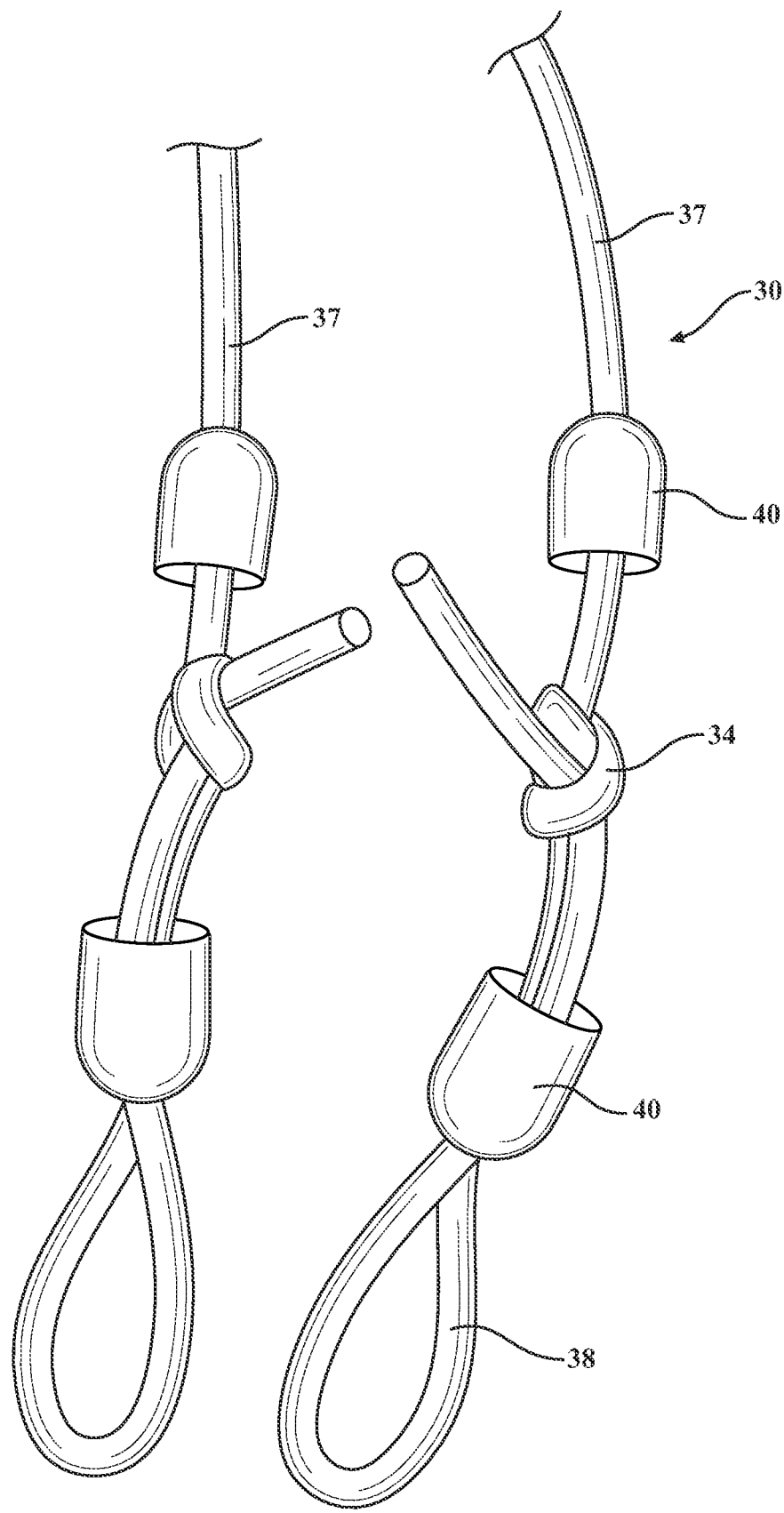
FIG. 9 is an enlarged illustration of the slip knot on the tail loops on the tail harnesses.

The stringer line 20, typically includes a portion without loops or a loop free portion 24, which provides spacing from the attachment point or end 28 to the first loop 22. Providing this loop free portion 24 allows the attachment point or end 28 may be located some distance from the water, and gives more options of how and to what the stringer 10 is connected. For example, the 10 foot stringer line 20 may have a non-looped or loop free portion 28 that is 5 feet long, which the 15 foot stringer line above has loop free portion 28 that is seven feet long. The stinger line 20 could be made a length that is longer or shorter than described. The stringer line 20 could be made with the number of loops 22, using loop knots 27, such as the illustrated overhand loop knot, being more or less then described. Longer non-looped portions 28 may also be used. As illustrated in FIG. 7, instead of making the stringer line 20 longer, two stringer lines 20 may be coupled together to form a single stringer 10, using the last loop 23 on the stringer line 20.

The stringer line 20 includes the attachment end 28 which has an attachment knot 29, which couples the cord portion to the stringer line 20 to a stringer attachment mechanism 24. As described in more detail below with regards to the tail harness 30, the attachment knot 29 may be coated with a waterproof coating to stiffen the knot and prevent the knot from unraveling or untying. The knot used for easy of manufacture is an overhand knot, but of course, other knots may be used, some of which may not require a waterproof coating The stringer 10 may include at least one tail harness 30. Each tail harness 30 may include a single tail loop 38, but preferably includes two tail loops 38. An attachment mechanism 32, such as a snap clip or another other releasable attachment mechanism 32 that keeps the tail harness secured to the stringer line may be used. The length of the tail harnesses 30 may vary but the illustrated tail harnesses having two 12 inch lines extending to about the ends of the loops. As a slip knot, such as simple slip knot is used to form the tail loops, as the tail loop diameter 38 becomes smaller the length of the tail harness of course will lengthen.

As with the stringer line 20, the tail harnesses 30 are typically formed from 550 wt. Paracord, with one end attached to the attachment mechanism 32, such as the illustrated swivel clip. While the tail harnesses may be made out of a single length of cord, it has been found for ease of manufacture two individual section of cord are used, with for each of them, one end being knotted to the swivel clip 32. The knot used for this attachment is an overhand knot, but other knots may be used as well. Each cord 35, 37 forming the tail harnesses then extends from the swivel clip 32 to the tail loops 38. The tail loops 38 are formed using tail loop knot 39, which is a basic slip knot, which has been found to balance the easy of movement with being secure and not allowing unintentional loosening. The slip knots 39 are then covered with knot covers to avoid any knot ends from rubbing on the fish and to prevent the knot from becoming undone. The knot covers 40 are not required but are helpful in preventing any debris from getting caught in the slip knot 39 as well. The knots 33 used to tie each one of the cords forming the tail harness 30 to the attachment mechanism or swivel clip 32 are tied and preferably sealed with water resistant sealer. For example, any waterproof sealer, glue or the like that stiffens the know and prevents it from unraveling or untying may be used but it has been found that FlexSeal® clear aerosol spray waterproof rubberized coating has good performance characteristics and allows for ease of manufacturing The opposite end of both sections has a slip knot adjustable loop and is not coated with the waterproof sealer to allow the knot to remain flexible and smooth consistent adjustment of the size of the tail loops 38. To prevent unraveling or untying, the tail loop knot 39 may be housed inside a knot cover 40, such as the illustrated interlocking rubber caps. When attaching each tail loop 38 of the tail harness 30 to a fish tail, it may be desirable to have them extend with the slip knot located on opposing sides of the fish tail.

While one tail loop 38 of a tail harness 30 will hold the fish in most circumstances, it has been found that the double loop design of the tail harness 30, where two tail loops 38 are attached to the fish, preferably with the slip know extending on opposite sides of the fish tail has found to be most effective for staying on the fish, thereby accomplishing the desired result. But in a pinch, if all tail harnesses 30 are full of fish, one tail loop could be removed from one fish and attached to another fish. In all situations, to properly secure the tail harness 30 to the fish, the draw-down component (the knot cover 40 containing the tail loop knot 39) of the tail loop 38 has to be pulled snuggly against the tail of the fish with the loops 38 surrounding the tail and the tail loop knots of the tail loops extending on opposing sides.

While the above description of the stringer uses paracord in the preferred embodiment, any other rope, strapping, line, cable, or any tie able material could be used on the stringer line and tail loop, so long as it could meet the desired performance characteristics of retaining a fish by the tail and allowing easy on and off of the tail harnesses 30 from the tail of the fish. Similarly, in place of the slip knot for the tail loop knot 39, other types of slip knots, draw clips, spring clips, pressure clips, zip ties, or other adjustable fasteners could be used on the tail loop, so long as they allow it to slide open or closed easily and do not release the loop freeing the fish in an unintended manner. As stated above, while useful, the knot cover 40 is not necessary and serves more as a as a cosmetic feature, therefore, the knot 39 could be exposed or contained inside any type of water-resistant enclosure that allows for the line to move freely along the slip knot. In addition, the tail harness lines could be attached to the swivel clip using knots, metal fasteners, stitching, or adhesive. This also would apply to the swivel clip 24 attached to the stringer line 20. Furthermore, the loops in the stringer line could be created using any metal or plastic ring (d-ring, circle ring, etc.), zip tie or other mechanism or feature to create in or attach a loop to the stringer line 20.

Figure 10:
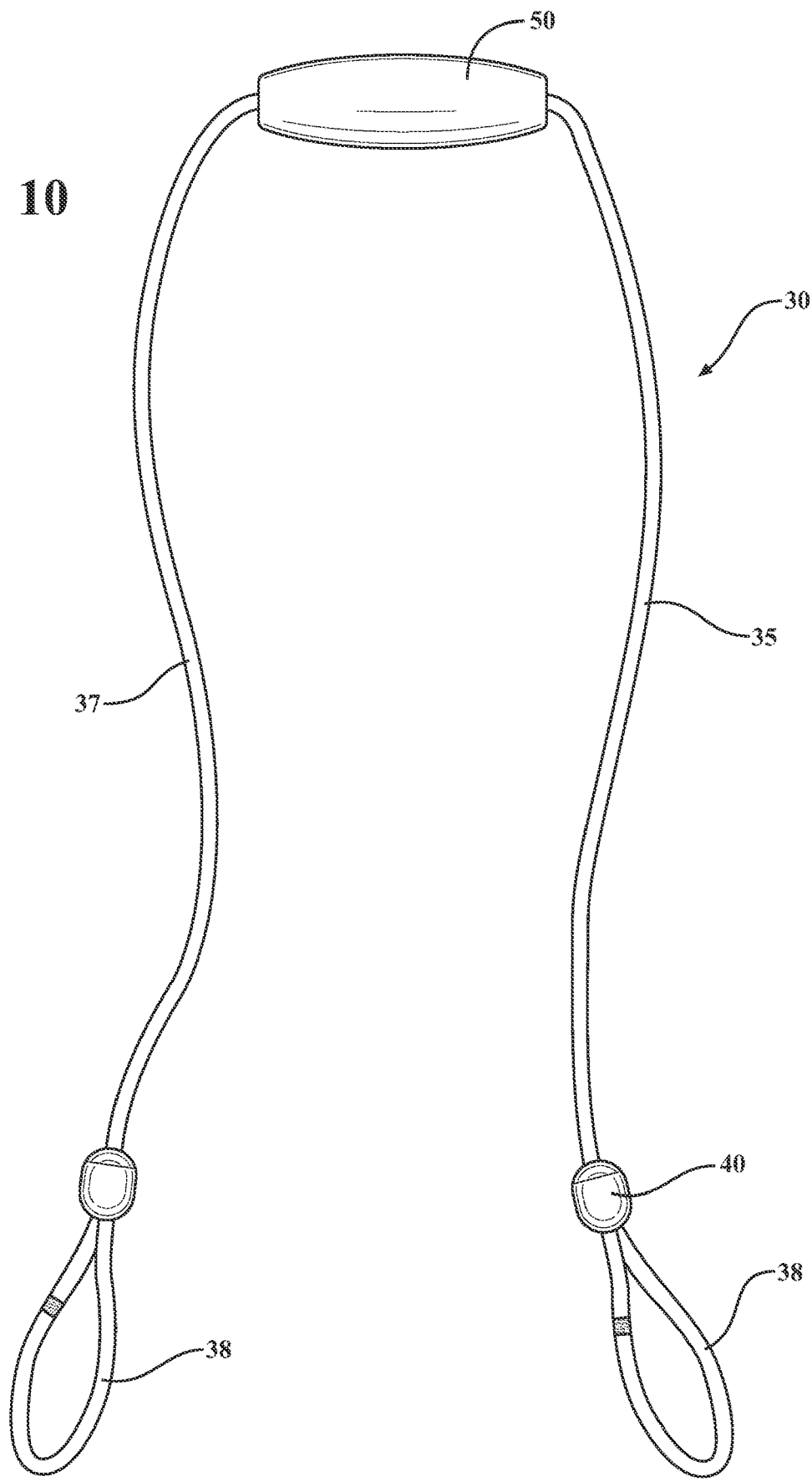
FIG. 10 is an illustration of a floating tail harness.

The tail harness 30 may also be modified as shown in FIGS. 10 and 11 to include a handle 50, preferable a floating handle. This floating handle 50 allow fish in a live well, such as illustrated in FIG. 11 to be easily grabbed and pulled from the live well. The tail harness 30 is basically identical as described above in the method of attaching it to a fish, including the tail loops 38, tail loop knots 39 and knot covers 40, however instead of attaching to a stringer line 20, the floating handle 50. The handles 50 may be color coded, to allow a person to log what are a fishes dimension so when they want to grab that fish, the know what color handle to grab.

The invention claimed is:

1. A fish stringer configured to attach to the tail of a fish and not contact the gills or mouth of the fish, said fish stringer comprising:
   a stringer line having a plurality of loops and an attachment mechanism at one end of said stringer line and spaced apart from said plurality of loops; and
   a plurality of tail harnesses, each having at least two tail loops configured to attach to the tail of the fish at one end, and an attachment mechanism at the other end coupled to one of said plurality of loops on said stringer line, and wherein each of said tail loops is formed using a slip knot, which allows adjustment of the size of the tail loops.

2. The fish stringer of claim 1 wherein said attachment mechanism on said tail harness is attached with an overhand knot, and said attachment mechanism on said stringer line is also attached with an overhand knot, both treated to prevent untying.

3. The fish stringer of claim 1 wherein said tail harness is configured to be installed on the fish tail with said first tail loop extending out on one side of the fish tail, and the other tail loop extending out on the other side of the fish tail.

4. The fish stringer of claim 1 wherein said tail harness has a float attached.

5. The fish stringer of claim 1 wherein said fish stringer is configured to not attach to the fins, mouth or gills of the fish.

\* \* \* \* \*